United States Patent
Moore et al.

(10) Patent No.: US 10,452,339 B2
(45) Date of Patent: Oct. 22, 2019

(54) MECHANISM FOR RETRIEVAL OF PREVIOUSLY CAPTURED AUDIO

(71) Applicant: Apple Inc., Cupertino, CA (US)

(72) Inventors: Jeffrey C. Moore, Belmont, CA (US); Richard M. Powell, Mountain View, CA (US); Alexander C. Powers, San Jose, CA (US); Anthony J. Guetta, San Carlos, CA (US)

(73) Assignee: APPLE INC., Cupertino, CA (US)

( * ) Notice: Subject to any disclaimer, the term of this patent is extended or adjusted under 35 U.S.C. 154(b) by 620 days.

(21) Appl. No.: 14/885,908

(22) Filed: Oct. 16, 2015

(65) Prior Publication Data

US 2016/0357508 A1  Dec. 8, 2016

Related U.S. Application Data

(60) Provisional application No. 62/171,753, filed on Jun. 5, 2015.

(51) Int. Cl.
| | |
|---|---|
| *G06F 17/00* | (2019.01) |
| *G06F 3/16* | (2006.01) |
| *G06F 13/20* | (2006.01) |
| *G11B 20/10* | (2006.01) |

(52) U.S. Cl.
CPC .............. *G06F 3/165* (2013.01); *G06F 3/162* (2013.01); *G06F 13/20* (2013.01); *G11B 2020/10666* (2013.01)

(58) Field of Classification Search
CPC . G06F 3/162; G06F 3/16; G06F 3/165; G06F 3/167; G06F 9/44505; H04N 21/2381; G11B 27/105; G11B 20/10527; G11B 2020/10638; G11B 2020/10666; G11B 2020/10703; G11B 2020/1062; G11B 2020/10898; G11B 2020/10546
See application file for complete search history.

(56) References Cited

U.S. PATENT DOCUMENTS

| | | |
|---|---|---|
| 5,953,695 A | 9/1999 | Barazesh |
| 7,412,376 B2 | 8/2008 | Florencio et al. |
| 7,631,119 B2 | 12/2009 | Moore et al. |

(Continued)

FOREIGN PATENT DOCUMENTS

| | | |
|---|---|---|
| CN | 101150717 A | 3/2008 |
| CN | 106250093 A | 12/2016 |
| EP | 3101533 A1 | 12/2016 |

OTHER PUBLICATIONS

Extended European Search Report, dated Oct. 6, 2016, European Application No. 16171261.

(Continued)

*Primary Examiner* — Md S Elahee
*Assistant Examiner* — David Siegel
(74) *Attorney, Agent, or Firm* — Womble Bond Dickinson (US) LLP

(57) ABSTRACT

In one embodiment, a device-side audio handling input/output unit (DIO) of a microphone writes audio data generated by the microphone into a ring buffer. A system-side audio handling I/O unit (SIO) receives a request from a software program to consume past audio data from the ring buffer. The SIO provides the past audio data from the ring buffer to the software program. Other embodiments are also described and claimed.

18 Claims, 5 Drawing Sheets

(56) References Cited

U.S. PATENT DOCUMENTS

| | | | |
|---|---|---|---|
| 7,774,077 | B1 | 8/2010 | Ford |
| 8,185,674 | B2 | 5/2012 | Moore et al. |
| 8,515,566 | B2 | 8/2013 | Ford |
| 8,781,832 | B2 | 7/2014 | Comerford et al. |
| 8,838,911 | B1 | 9/2014 | Hubin et al. |
| 9,564,131 | B2 | 2/2017 | Liu et al. |
| 2008/0147213 | A1 | 6/2008 | Omiya et al. |
| 2008/0147917 | A1 | 6/2008 | Lees et al. |
| 2010/0312927 | A1 | 12/2010 | Moore et al. |
| 2014/0214429 | A1* | 7/2014 | Pantel .................. G10L 21/16 704/275 |
| 2016/0152211 | A1* | 6/2016 | Owens ................ B60R 25/102 348/36 |
| 2017/0358294 | A1* | 12/2017 | Hatfield ................ G10L 15/22 |
| 2018/0052786 | A1* | 2/2018 | Plisson ............... G06F 13/1673 |

OTHER PUBLICATIONS

Chinese Office Action dated Sep. 4, 2018 for related Chinese Patent Appln. No. 201610364567.6 12 pages.
Office Action received for European Patent Application No. 16171261.7, dated Apr. 26, 2018, 7 pages.
Second Chinese Office Action dated Mar. 27, 2019 for related Chinese Patent Appln. No. 201610364567.6 15 pages.
Summons to Attend Oral Proceedings for related European Appln No. 16171261.7 15 Pages.
Third Chinese Office Action dated Jun. 28, 2019 for related Chinese Patent Appln. No. 201610364567.6 6 pages.

* cited by examiner

MECHANISM FOR RETRIEVAL OF PREVIOUSLY CAPTURED AUDIO

This non-provisional application claims the benefit of the earlier filing date of U.S. provisional application No. 62/171,753 filed Jun. 5, 2015.

FIELD

An embodiment of the invention is related to providing past audio data from a ring buffer to a system-side audio handling input/output unit that interfaces with a software program, in order to provide past audio data generated by a hardware device to the software program. Other embodiments are also described.

BACKGROUND

Software programs executing on a computer system generally communicate with audio hardware devices (e.g., a microphone) of the system, through device driver programs associated with the audio devices (and that may be part of the operating system on which the software programs are executing). For example, a software program can access audio data generated by a microphone by interacting with the device driver program of the microphone. A ring buffer is used to temporarily store audio data that is being communicated between the software program and the device driver program. The device driver program writes audio data into the ring buffer as audio data is generated by the hardware device (e.g., microphone). The software program estimates when a pre-arranged quantum of audio data will be available in the ring buffer and consumes audio data from the ring buffer when it determines that the quantum of audio data is available.

Some computer systems include a dedicated microphone path that is always recording, and thus continuously writing audio data into the ring buffer. The dedicated microphone path is useful for detecting voice commands from a user without the user having to manually activate a voice command application or even without having to "wake up" the device. For example, the "Hey Siri" feature available in the IPHONE® and IPAD® devices leverage the dedicated microphone path to detect voice commands from the user even while parts of the device are in sleep mode or otherwise deactivated.

SUMMARY

Various software programs, such as voice command applications on handheld portable devices, rely on consuming audio captured by a microphone. When a user presses a button to activate the voice command application, it may take some time (e.g., hundreds of milliseconds) for the voice command application to configure the software/hardware of the device to accept the user's speech. When the voice command application is ready to accept the user's speech, it may audibly notify the user (e.g., with a bell sound) or notify the user through a visual indication on the display of the device. However, the user may start to speak voice commands to the voice command application before the voice command application notifies the user that it is ready to accept the user's speech. As such, the startup time delay may cause the voice command application to only receive a portion of the user's speech (i.e., the beginning of the user's speech gets cut off). For example, the user may trigger the voice command application by pressing a button (or by speaking a trigger command such as "Hey Siri") and then immediately start to speak a user command (e.g., "navigate to the nearest gasoline station"). Due to the startup time delay, the voice command application may not receive the first word of the user command, and thus receive an incomplete user command (e.g., "to the nearest gasoline station"). Embodiments leverage a dedicated microphone path that is always recording to have the voice command application go back in the past and access audio data that was captured before the voice command application was ready to accept the user's speech or even before the voice command application was triggered.

An embodiment allows for a software program (e.g., a client application) executing on a computer system to consume past audio data from a ring buffer. The client application can issue a request to consume not only real-time audio data, but also to consume past audio data from the ring buffer. The client application can consume the past audio data as fast as possible until it "catches up" to real-time. Once the client application "catches up" to real-time, the client application can then continue to consume real-time audio data. In one embodiment, the client application interfaces with a system-side audio handling input/output (I/O) unit (SIO) to consume past audio data from the ring buffer. The SIO receives a request from the client application to consume past audio data and the SIO responds to the request by providing past audio data to the client application.

The above summary does not include an exhaustive list of all aspects of the present invention. It is contemplated that the invention includes all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, a given figure may be used to illustrate the features of more than one embodiment of the invention in the interest of reducing the total number of drawings, and as a result, not all elements in the figure may be required for a given embodiment.

DETAILED DESCRIPTION

Several embodiments of the invention with reference to the appended drawings are now explained. Whenever aspects of the embodiments described here are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
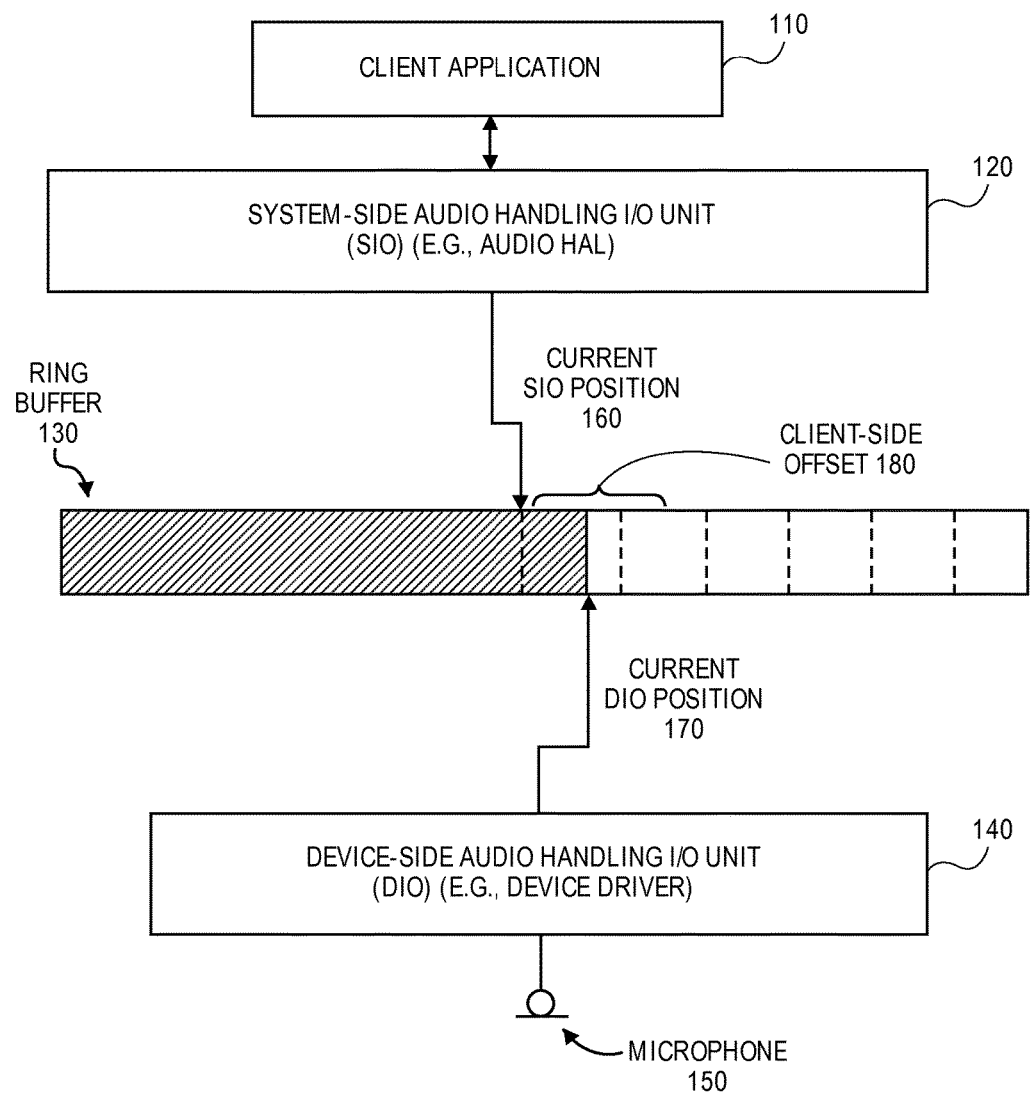
FIG. 1 is a block diagram illustrating an audio input/output (I/O) system that communicates audio data using a ring buffer, according to some embodiments.

FIG. 1 is a block diagram illustrating an audio input/output (I/O) system that communicates audio data using a ring buffer, according to some embodiments. The audio I/O system includes a ring buffer 130, a client application 110, a system-side audio handling I/O unit (SIO) 120, a microphone 150, and a device-side audio handling I/O unit (DIO) 140. The audio I/O system generally communicates audio data captured by the microphone 150 to the client application 110 using the ring buffer 130 as a rendezvous point for the audio data. The SIO 120 generally represents a system-side interface (e.g., as part of an operating system program, OS) that provides an interface for client applications to interact with hardware devices such as the microphone 150. In one embodiment, the SIO 120 provides an application programming interface (API) for the client application 110 or other software programs to interact with hardware devices (e.g., the microphone 150) of the system. The client application 110 can invoke a routine of the SIO 120 so that the client application 110 can consume audio data that has been captured by the microphone 150 or other hardware device capable of generating/providing audio data. The client application 110 may be executed by one or more client threads. In one embodiment, the SIO 120 is the audio hardware abstraction layer (Audio HAL) provided in the core audio framework of the iOS® operating system, available from Apple, Inc. of Cupertino, Calif.

The DIO 140 generally represents a device-side interface (e.g., also as part of the OS) that provides an interface to operate or control hardware devices such as the microphone 150. The DIO 140 enables higher level programs to access hardware functions of a hardware device (e.g., a microphone) without needing to know details of the hardware functions. For example, upper layer programs may interface with the DIO 140 to activate a microphone 150 and to pick up sound captured by the microphone 150 as a digital audio bit stream. In one embodiment, the DIO 140 may be a device driver for a hardware device. For example, the DIO 140 may be a microphone device driver. The DIO 140 is typically hardware device dependent (i.e., each hardware device has its own DIO 140), and also specific to a given operating system (OS). The DIO 140 may be executed by one or more device threads. In one embodiment, one or more of the device threads may be executed by a direct memory access ("DMA") co-processor to write audio data captured by the microphone 150 into the ring buffer 130.

For convenience of expression, software components, such as the SIO 120 and DIO 140, are described as performing operations, although a processor executing the software components performs the operations in response to executing the instructions of the software components. For example, stating that the DIO 140 writes audio data into the ring buffer 130 is a convenient way of stating that a processor (e.g., a CPU or a DMA co-processor) on a computer system executes software instructions of the DIO 140 to write audio data into the ring buffer 130.

When the microphone 150 is active (i.e., capturing audio), the DIO 140 writes audio data captured by the microphone 150 into the ring buffer 130. The current position at which the DIO 140 writes audio data into the ring buffer 130 is referred to herein as the "current DIO position." The current DIO position 170 wraps around to the start of the ring buffer 130 upon reaching the end of the ring buffer 130.

The SIO 120 reads audio data from the ring buffer 130. The current position at which the SIO 120 reads audio data from the ring buffer 130 is referred to herein as the "current SIO position." The current SIO position 160 wraps around to the start of the ring buffer 130 upon reaching the end of the ring buffer 130. To read audio data from the ring buffer 130, the SIO 120 needs to know the current DIO position 170. However, it is inefficient for the DIO 140 to continuously communicate the current DIO position 170 to the SIO 120. Thus, in one embodiment, the DIO 140 periodically generates information that the SIO 120 can use to estimate or predict the current DIO position 170. For example, the DIO 140 can generate a timestamp each time the current DIO position 170 wraps around from the end of the ring buffer 130 to the start of the ring buffer 130. The SIO 120 may then estimate the current DIO position 170 based on a statistical analysis of such timestamps.

The SIO 120 reads audio data from the ring buffer 130 at a position that lags behind the estimated current DIO position 170, as shown in FIG. 1. This ensures that the SIO 120 does not read audio data that has yet to be written into the ring buffer 130. In one embodiment, the SIO 120 maintains at least a client-side offset 180 between the current SIO position 160 and the estimated current DIO position 170 before or when reading audio data from the ring buffer 130 to ensure that the SIO 120 does not read audio data ahead of the current DIO position 170. The client-side offset 180 is essentially a limitation on how closely the SIO 120 can read audio data from the ring buffer 130 behind the estimated current DIO position 170. The SIO 120 puts a client thread of the client application 110 that is consuming audio data to sleep until the SIO 120 determines that the current DIO position 170 is ahead of the current SIO position 160 at least by the client-side offset 180. When the SIO 120 determines that the current DIO position 170 is ahead of the current SIO position 160 at least by the client-side offset 180, the SIO 120 wakes up the client thread to provide audio data (from the ring buffer 130 and at the current SIO position 160) to the client application 110.

In one embodiment, the SIO 120 reads a pre-arranged quantum of audio data from the ring buffer 130, referred to herein as a buffer unit. A buffer unit holds audio data representing an audio signal over a period of time. The period of time is referred to herein as the duration of the buffer unit. If a buffer unit holds audio data for 10 milliseconds of playback, the duration of the buffer unit is 10 milliseconds. As shown, each buffer unit is delineated by dotted lines. In one embodiment, each client application 110 may specify the duration of a buffer unit, as desired.

Figure 2A:
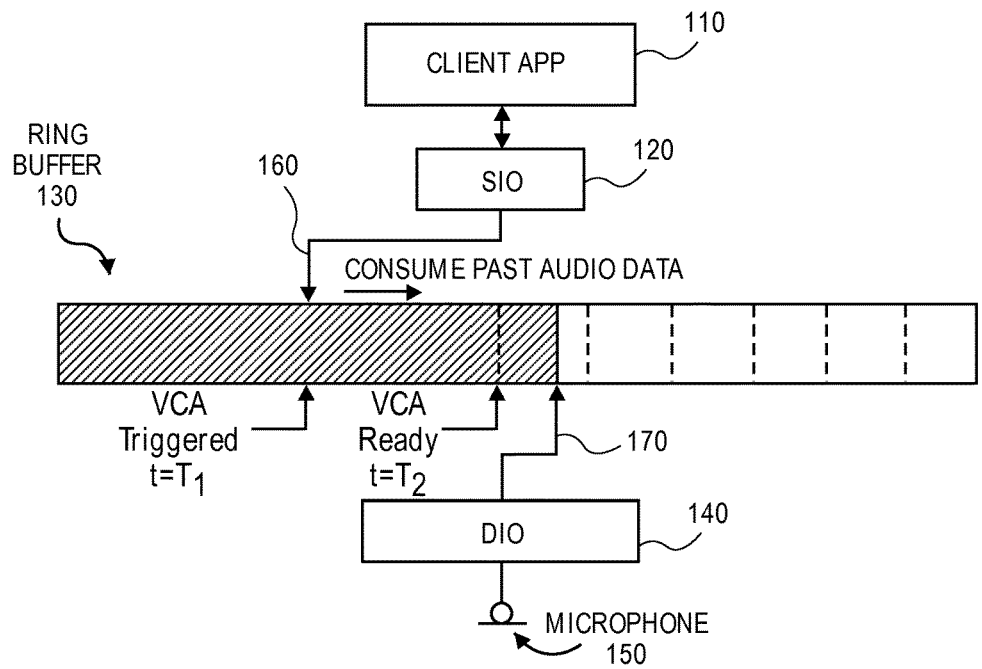
FIG. 2A is a block diagram illustrating an audio input/output (I/O) system in which the SIO is providing past audio data from the ring buffer to the client application, according to some embodiments.

FIG. 2A is a block diagram illustrating an audio input/output (I/O) system in which the SIO is providing past audio data from the ring buffer to the client application, according to some embodiments. As discussed above, a client application 110 can invoke a routine of the SIO 120 to consume audio data generated by the microphone 150 from the ring buffer 130. The SIO 120 puts the client thread of the client application 110 to sleep until it determines that a buffer unit of audio data is available in the ring buffer 130 for consumption by the client application 110. When the SIO 120 determines that a buffer unit of audio data is available in the ring buffer 130, the SIO 120 wakes up the client thread and provides the buffer unit of audio data to the client application 110. The SIO 120 repeats this cycle of sleeping and waking up the client thread to provide audio data to the client application 110 as audio data is made available in the ring buffer 130. This mode of providing audio data where the SIO 120 periodically wakes up the client thread to provide audio data from the ring buffer 130 as audio data is made available is referred to herein as providing audio data in real-time. Similarly, a client application 110 that consumes audio data provided in such a manner is said to be consuming audio data in real-time.

In one embodiment, the computer system implements a dedicated microphone path that is always recording, and thus continuously writing audio data into the ring buffer 130. As such, audio data previously recorded by the dedicated microphone path may already exist in the ring buffer 130 at the time the client application 110 invokes a routine of the SIO 120 to consume audio data generated by the microphone 150. Embodiments allow for the client application 110 to consume this pre-existing audio data from the ring buffer 130. The pre-existing audio data in the ring buffer 130 will be referred to herein as past audio data. In one embodiment, the SIO 120 includes a routine that provides past audio data to a client application 110 requesting past audio data. The client application 110 may invoke this routine of the SIO 120 to consume past audio data generated by the microphone 150. In one embodiment, the client application 110 specifies a time value to the routine of the SIO 120 that specifies an amount of time in the past from which to start consuming audio data from the ring buffer 130. For example, the client application 110 may specify a time value that indicates it wants to consume audio starting from 500 milliseconds in the past. The SIO 120 then determines a position in the ring buffer 130 that corresponds to the audio data from 500 milliseconds in the past. The SIO 120 then sets the current SIO position 160 to the position in the ring buffer 130 corresponding to the specified time in the past. The SIO 120 then provides audio data to the client application 110 starting from this position and going forward-in-time until catching up with real-time data being written into the ring buffer 130. It is to be noted that the SIO 120 need not perform the sleeping and waking up of the client thread that are needed for the real-time provision of audio data since the past audio data already exists in the ring buffer 130, and thus there is no need for the client thread to wait for audio data to be made available in the ring buffer 130. As such, the SIO 120 may provide the past audio to the client application 110 as fast as possible until catching up to the real-time audio data being written into the ring buffer 130.

In one embodiment, the client application 110 may invoke a routine of the SIO 120 to determine whether past audio data can be accessed from the ring buffer 130. The SIO 120 may respond to the request (received from the client application 110 through invocation of a routine of the SIO 120) with an indication of whether past audio data can be accessed or not. In one embodiment, the client application 110 may invoke a routine of the SIO 120 to determine how much past audio data is available in the ring buffer 130. The SIO 120 may respond to the request (received from the client application 110 through invocation of a routine of the SIO 120) with the amount of past audio data available in the ring buffer 130.

As an example, consider the voice command application discussed above in the summary section, in connection with FIG. 2A. The user activates the voice command application (VCA) at time $t=T_1$. However, due to a startup time delay, the VCA is not ready to consume audio data from the ring buffer 130 until time $t=T_2$. As such, the VCA starts consuming audio data in real-time starting from time $t=T_2$. However, the VCA cannot consume or otherwise access the audio data stored in the ring buffer 130 before time $t=T_2$. Embodiments allow the VCA to consume this past audio data from the ring buffer 130 (e.g., by invoking a routine of the SIO as discussed above), and as a result, the VCA can pick up utterances that were spoken by the user before the VCA was ready to accept input.

Figure 2B:
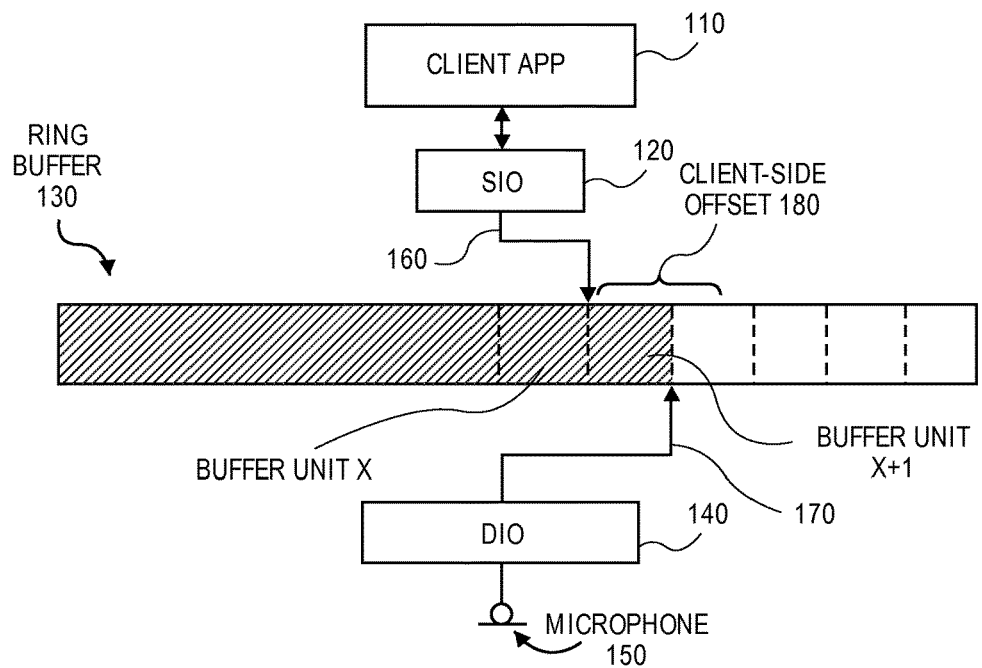
FIG. 2B is a block diagram illustrating an audio input/output (I/O) system in which the SIO has provided past audio data to the client application and has caught up with the real-time audio data, according to some embodiments.

FIG. 2B is a block diagram illustrating an audio input/output (I/O) system in which the SIO has provided past audio data to the client application and has caught up with the real-time audio data, according to some embodiments. After the SIO 120 provides the past audio data to the client application 110, the SIO 120 eventually catches up to the real-time audio data being written into the ring buffer 130. During the time that the SIO 120 was providing past audio data to the client application 110, the DIO 140 may have written additional audio data into the ring buffer 130. For example, the DIO 140 may have finished writing audio data into buffer unit X and also written audio data into buffer unit X+1 while the SIO 120 was providing past audio data to the client application 110. When the client application 110 first invoked the routine of the SIO 120 to consume past audio data, buffer unit X was not ready for consumption by the client application 110 (see FIG. 2A which shows buffer unit X as being only partially shaded). However, by the time the SIO 120 finishes providing the past audio data to the client application 110 and reaches the start of buffer unit X, the buffer unit X is now available for consumption and is treated as past audio data. As such, the SIO 120 provides the audio data in buffer unit X to the client application 110 without putting the client thread to sleep or otherwise waiting for the audio data in buffer unit X to be made available, since the audio data in buffer unit X is now available. However, when the SIP has caught up with the real time audio data as depicted in FIG. 2B, buffer unit X+1 is not yet available for consumption since the current DIO position 170 is not ahead of the current SIO 160 position at least by the client-side offset 180. Thus, when the SIO 120 reaches the beginning of buffer unit X+1, it needs to wait before it can provide the audio data within buffer unit X+1 to the client application 110. Accordingly, starting from buffer unit X+1 and going forward, the SIO 120 provides audio data to the client application 110 in real-time (i.e., periodically waking up the client thread to provide audio data to the client application 110 as audio data is made available). In this way, the SIO 120 provides past audio data from the ring buffer to the client application 110, and also seamlessly continues to provide real-time audio data from the ring buffer 130 after providing the past audio data.

Figure 3:
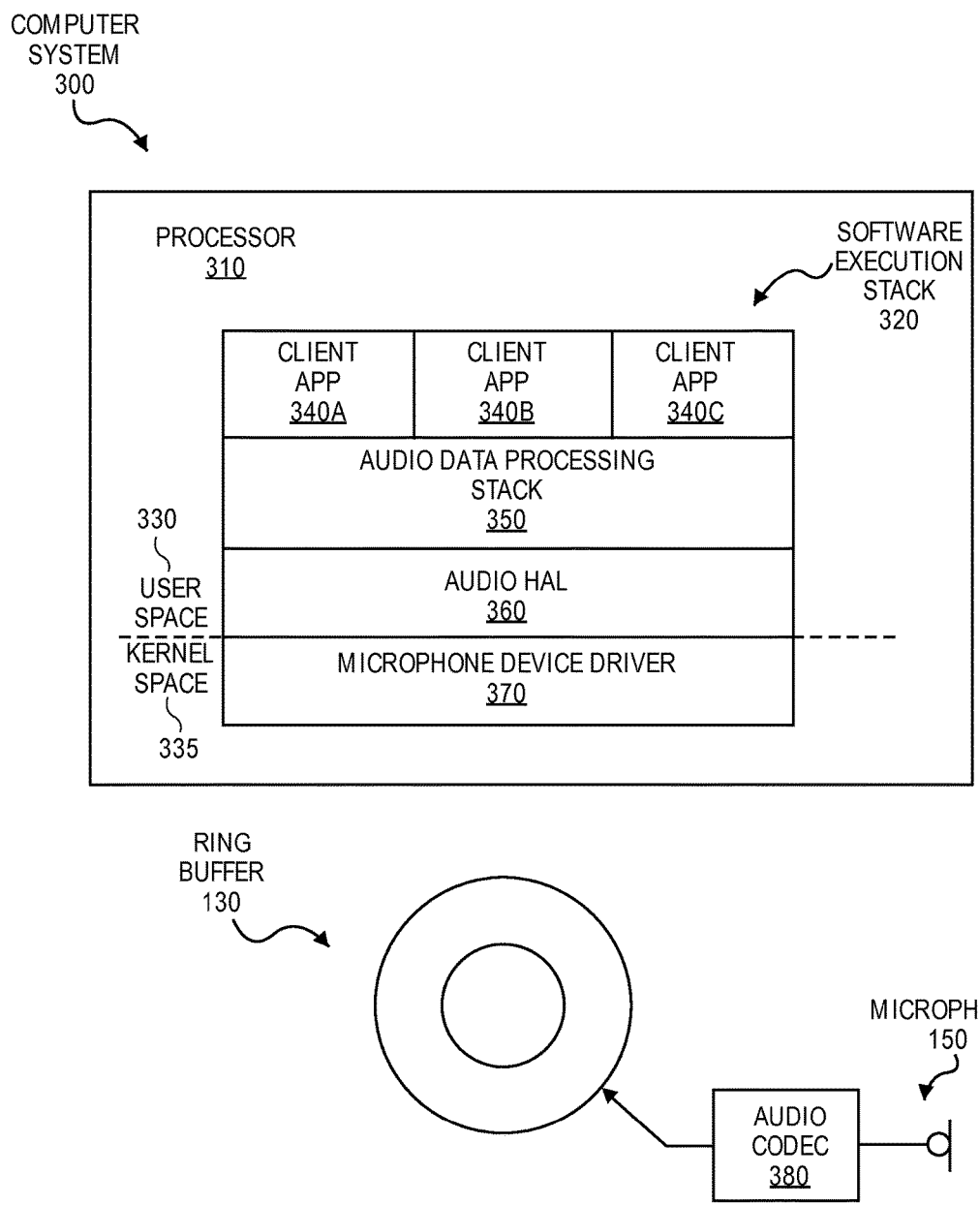
FIG. 3 is a block diagram illustrating a computer system that allows for providing past audio data to client applications, according to some embodiments.

FIG. 3 is a block diagram illustrating a computer system that allows for providing past audio data to client applications, according to some embodiments. The computer system 300 includes a processor 310, a ring buffer 130, and a microphone 150. The processor 310 may be a special purpose processor such as an application-specific integrated circuit (ASIC), a general purpose microprocessor, a field-programmable gate array (FPGA), a digital signal controller, or a set of hardware logic structures. The processor 310 executes a software execution stack 320. The software execution stack 320 can be divided into a user space 330 and kernel space 335. The user space 330 includes client applications 340A-C, an audio data processing stack 350, and an audio hardware abstraction layer (Audio HAL) 360. The kernel space 335 includes a microphone device driver 370. The ring buffer 130 is also part of the kernel space 335. For the sake of illustration, the software execution stack 320 and its various layers are depicted as being inside the processor 310 as a convenient way of showing that the various layers of the software execution stack 320 are executed by the processor 310, and not that they are necessarily implemented within the processor 310 or that their associated software instructions are stored within the processor 310. See below for an example of how the layers of the software execution stack 320 may be separated in a "distributed" implementation of the audio I/O system, between an application and an OS running in a handheld portable system such as a smartphone, and software including virtual machine software that is running in an in-vehicle infotainment unit.

At the top of the software execution stack 320 are client applications 340A-C. The client applications 340A-C can be any type of software program that wishes to consume audio data generated by the microphone 150. Accordingly, the client applications 340A-C are considered to be the consumers of the audio data. At the bottom of the software execution stack 320 is the microphone device driver 370 that interfaces with the microphone 150. The microphone device driver 370 is an example of a DIO 140. As such, the microphone device driver 370 may implement any of the operations of the DIO 140 described herein including controlling the operations of the microphone 150. In one embodiment, the microphone device driver 370 is responsible for storing audio data captured by the microphone 150 into the ring buffer 130. In one embodiment, the audio data captured by the microphone 150 is processed by an audio codec 380 before being stored in the ring buffer 130. In one embodiment, the audio codec 380 includes an analog-to-digital converter (ADC) to convert analog audio signals captured by the microphone 150 into digital form.

The client applications 340A-C interface with the microphone 150 through the Audio HAL 360. The Audio HAL 360 provides a consistent and predictable interface for client applications 340A-C or other software programs to interact with hardware devices (e.g., the microphone 150). The Audio HAL 360 is an example of an SIO 120. As such, the Audio HAL 360 may implement any of the operations of the SIO 120 described herein including operations related to providing past audio data to client applications (e.g., client application 110). In one embodiment, the Audio HAL 360 provides an application programming interface (API) that includes a routine to consume past audio data. In one embodiment, the routine to consume past audio data includes an input parameter to specify a time in the past from which to start consuming past audio data. In one embodiment, the Audio HAL API includes a routine to determine whether past audio data can be accessed. In one embodiment, the Audio HAL API includes a routine to determine how much past audio data is available in the ring buffer 130. Thus, the client applications 340A-C can interface with the Audio HAL 360 (e.g., by invoking routines of the Audio HAL) to consume past audio data from the ring buffer 130. In one embodiment, the audio processing stack 350 exists between the client applications 340A-C and the Audio HAL 360 in the software execution stack 320 to process audio data provided by the Audio HAL 360 before the audio data is provided to the client applications 340A-C.

Figure 4:
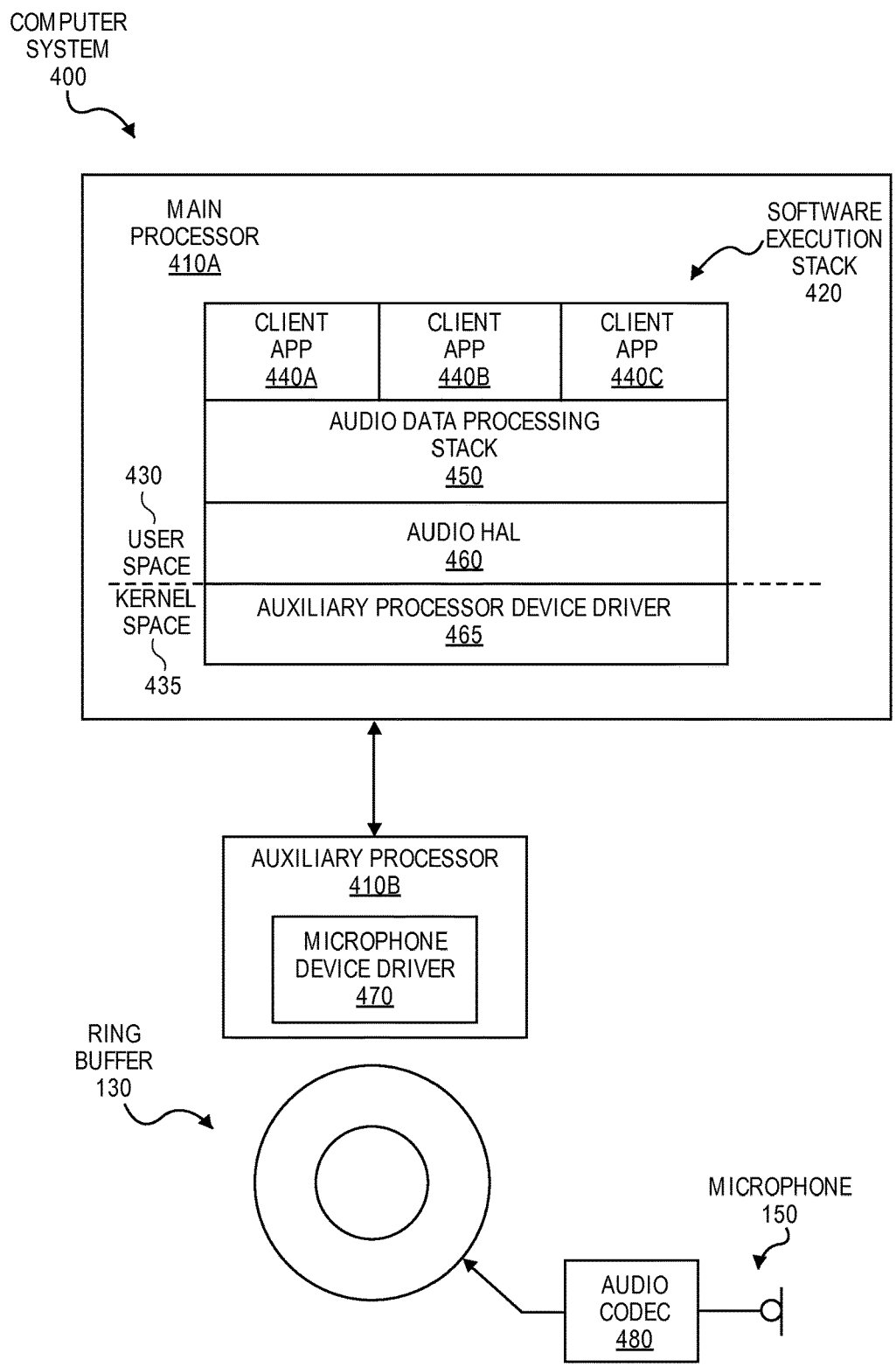
FIG. 4 is a block diagram illustrating a multi-processor computer system that allows for providing past audio data to client applications, according to some embodiments.

FIG. 4 is a block diagram illustrating a multi-processor computer system that allows for providing past audio data to client applications, according to some embodiments. The computer system 400 includes a main processor 410A, an auxiliary processor 410B, a ring buffer 130, and a microphone 150. The main processor 410A and the auxiliary processor 410B may be a special purpose processor such as an application-specific integrated circuit (ASIC), a general purpose microprocessor, a field-programmable gate array (FPGA), a digital signal controller, or a set of hardware logic structures.

In one embodiment, the main processor 410A is configured to perform a wide range of tasks while the computer system 400 is in "wake" mode, including complex computational operations such as rendering graphical output on a display of the computer system and transmitting data over a network. In contrast, the auxiliary processor 410B is configured to perform a relatively limited range or small number of computationally inexpensive operations while the device is in power-saving mode or "sleep" mode (e.g., when the computer system 400 is in suspended Random Access Memory (RAM) mode and/or when the primary visual interface of the computer system 400 such as the touchscreen or keyboard are not fully activated, for example, when the lock screen on a handheld portable computer system is turned on). Such computationally inexpensive operations or limited range tasks may include writing audio data generated by the microphone 150 into the ring buffer 130. The main processor 410A, when fully active, requires a much greater amount of overall power than the auxiliary processor 410B. The main processor 410A itself can transition to a power-saving mode such as a deactivated or sleep state, by, for example, essentially ceasing all computational operations. Placing the main processor 410A into power-saving mode may substantially decrease the burden on the power source for the computer system 400 (e.g., a battery). The auxiliary processor 410B may remain fully functional (i.e., activated or awake), while the main processor 410A is in the power-saving mode and while the computer system 400 as a whole is in sleep mode, serving to continuously write audio data generated by the microphone 150 into the ring buffer 130.

The main processor 410A executes a software execution stack 420. The software execution stack 420 can be divided into a user space 430 and kernel space 435. The user space 430 includes client applications 440A-C, an audio data processing stack 450, and an audio hardware abstraction layer (Audio HAL) 460. The kernel space 435 includes an auxiliary processor device driver 465 to control the operations of the auxiliary processor.

In one embodiment, the auxiliary processor 410B includes a microphone device driver 470. The microphone device driver 470 implements similar functionality to the microphone device driver 370 described with reference to FIG. 3. For example, the microphone device driver 470 may be responsible for storing audio data captured by the microphone 150 into the ring buffer 130. In one embodiment, the audio data captured by the microphone 150 is processed by an audio codec 480 before being stored in the ring buffer 130. In one embodiment, the microphone device driver 470 is executed in a kernel space and the ring buffer 130 is part of the kernel space.

The auxiliary processor 410B is configured to be complimentary to the main processor 410A by remaining activated while the main processor is deactivated. The auxiliary processor 410B may accomplish this in any combination of ways. For example, the auxiliary processor 410B can be perpetually activated ("always on") or it may be activated in response to the main processor 410A being deactivated. Accordingly, the auxiliary processor 410B can execute the microphone device driver 470 to store audio data captured by the microphone 150 into the ring buffer 130 even while the main processor 410A is deactivated or in a power-saving mode (e.g., sleep mode). This allows for the client applications 440A-C to consume past audio data that was captured while the main processor 410A was in power-saving mode.

The Audio HAL 460 interfaces with the auxiliary processor device driver 465 to obtain audio data from the ring buffer 130. Although a single auxiliary processor 410B is depicted in the drawing, other embodiments of the computer system 400 may include more than one auxiliary processor 410B. The Audio HAL 460 may implement any of the operations of the SIO 120 described herein including operations related to providing past audio data to client applications 440A-C. Thus, the client applications 440A-C can interface with the Audio HAL 460 (e.g., by invoking routines of the Audio HAL) to consume past audio data from the ring buffer 130.

Figure 5:
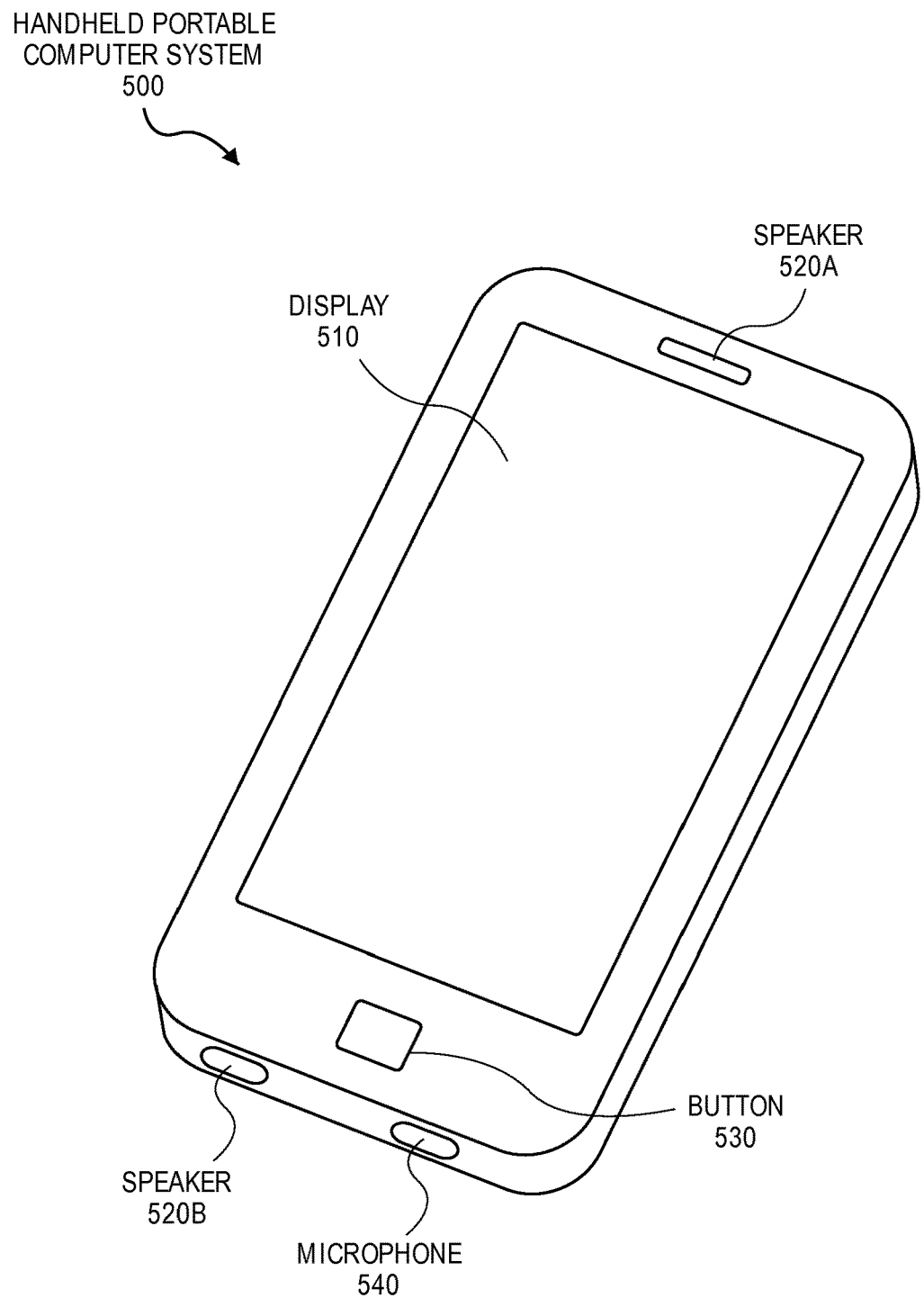
FIG. 5 is a diagram illustrating a handheld portable computer system, also referred to as a mobile communications device, according to some embodiments.

FIG. 5 is a diagram illustrating a handheld portable computer system, also referred to as a mobile communications device or simply a handheld portable, according to some embodiments. The handheld portable computer system 500 includes a number of components that are typically found in such devices. Here, the handheld portable computer system 500 includes a display 510, speakers 520A and 520B, a button 530, and a built-in microphone 540. Additional microphones may be integrated in the handheld portable computer system 500. In one embodiment, an external microphone may be coupled to the handheld portable computer system 500, e.g., via a headset. The handheld portable computer system 500 may provide the ability for client applications or other software programs running within the handheld portable computer system 500 to consume past audio data captured by the microphone 540, according to embodiments described herein.

Various software programs can benefit from the ability to consume past audio data. For example, as discussed above, this feature is applicable to voice command applications such as the SIRED program on the IPHONE®/IPAD® devices, available from Apple, Inc. of Cupertino, Calif. Often times, when a user activates a voice command application, the user starts speaking before the voice command application is ready to accept input (e.g., voice command applications commonly notify the user that it is ready to accept input by playing a sound effect), which results in the voice command application only receiving a portion of the user's speech. The ability to consume past audio data (e.g., from a dedicated microphone path that is continuously writing audio data into the ring buffer) will allow the voice command application to pick up utterances that were spoken before the voice command application was ready to accept input, and even before the user activated the voice command application, thereby giving the user the appearance that the voice command application can accept the user's speech instantaneously (i.e., as soon as the user activates the voice command application).

Other types of software programs that can benefit from the ability to consume past audio data are music recognition applications such as Shazam, available from Shazam of London, United Kingdom. Often times, when a user hears a song they wish to identify, the user scrambles to open their music recognition application, but by the time the application is opened, the song has already finished or the song is not audible anymore. As such, the user misses the opportunity to identify the song. The ability to consume past audio data will allow the music recognition application to go back in time and listen to the song that was playing, and identify the song for the user.

It should be noted that the applications mentioned here are provided by way of example and not limitation. Other types of applications other than the ones mentioned here can utilize the ability to consume past audio data to implement various useful functionalities.

Also, the block diagram of the audio I/O system shown in FIG. 1 may be implemented not just in a handheld portable as shown in FIG. 5, where in that case all of the software or hardware components depicted in FIG. 1 may be resident within a single housing of a smartphone or a table computer; the audio I/O system may also be implemented in a "distributed" fashion. For example, consider the case of a handheld portable, such as a smartphone, being communicatively linked to an in-vehicle infotainment unit via either a wired connection (e.g., in accordance with a Universal Serial Bus, USB, specification) or a wireless connection (e.g., in accordance with a Bluetooth specification.) In that case, the DIO 140 and the ring buffer 130 may be part of a virtual machine that is running on top a native OS of the in-vehicle infotainment unit, while the client application 110 and the SIO 120 are running in the handheld portable. There are several instances where the above-described request for past audio data (by the client application 110) could be triggered, in such a distributed, audio I/O system. These include i) a user pressing a menu button on the smartphone, ii) the user pressing a button on the vehicle's steering wheel or other physical interface, which causes the virtual machine to signal the smartphone (and hence alert the client application 110), and iii) speech recognition software running in the in-vehicle infotainment center, e.g., on top of the virtual machine, that recognizes a trigger phrase, e.g., "Hey Siri", within a signal from a microphone of the vehicle, and in response signals the smartphone (and hence alerts the client application 110). In all such instances, the audio I/O system has effectively an "always listening microphone" in that audio data captured by a vehicle microphone is continuously being written to the ring buffer 130 by the DIO 140, but is not being streamed to the smartphone. Once the request for past audio data is produced by the client application 110, the SIO 120 manages the reading of audio data from the ring buffer 130 as described above in connection with FIGS. 1, 2A, 2B, except that it does so over the existing wired or wireless connection between the smartphone and the virtual machine running in the in-vehicle infotainment unit.

An embodiment may be an article of manufacture in which a machine-readable storage medium has stored thereon instructions, which program one or more data processing components (generically referred to here as a "processor") to perform the operations described above. Examples of machine-readable storage mediums include read-only memory, random-access memory, CD-ROMs, DVDs, magnetic tape, and optical data storage devices. The machine-readable storage medium can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art.

What is claimed is:

1. A method performed by a computer system, comprising:
   writing, by a device-side audio handling input/output unit (DIO) of a hardware device, audio data generated by the hardware device at a DIO position into a ring buffer;
   receiving, by a system-side audio handling input/output unit (SIO), a request from a software program to consume past audio data from the ring buffer;
   providing, by the SIO, the past audio data from the ring buffer to the software program, starting from an SIO position that is behind the DIO position in the ring buffer;
   putting, by the SIO, a client thread of the software program to sleep until the DIO position is ahead of the SIO position by at least a client-side offset; and
   when the DIO position is ahead of the SIO position by at least the client-side offset
      awaking, by the SIO, the client thread of the software program, and
      providing, by the SIO, the audio data from the ring buffer to the software program, by starting to provide the audio data from the SIO position within the ring buffer after providing the past audio data and catching up to real-time audio data being written into the ring buffer.

2. The method of claim 1, further comprising:
   providing, by the SIO, an amount of the past audio data available in the ring buffer to the software program in response to receiving a request from the software program to determine how much of the past audio data is available in the ring buffer.

3. The method of claim 1, further comprising:
   providing, by the SIO, an indication to the software program of whether the past audio data can be accessed in response to receiving a request from the software program to determine whether the past audio data can be accessed.

4. The method of claim 1, wherein the request to consume the past audio data from the ring buffer specifies a time value, wherein the time value corresponds to a position in the ring buffer from which to start providing the past audio data.

5. The method of claim 1, wherein the hardware device is a microphone and the audio data is sound captured by the microphone.

6. The method of claim 1, wherein the software program is a voice command application or a music recognition application.

7. The method of claim 1, wherein the software program and the SIO is executed by a main processor of the computer system and the DIO of the hardware device is executed by an auxiliary processor of the computer system, wherein the auxiliary processor is active while the main processor is deactivated.

8. The method of claim 1, wherein the DIO is executed in a kernel space of an operating system and wherein the ring buffer is in the kernel space of the operating system.

9. A computer system comprising:
   one or more processors; and
   a non-transitory computer readable storage medium having instructions stored therein, the instructions when executed by the one or more processors cause the computer system to
   write, by a device-side audio handling input/output unit (DIO) of a hardware device, audio data generated by the hardware device at a DIO position within a ring buffer, wherein the DIO enables higher layer programs to access hardware functions of the hardware device without needing to know details of the hardware functions,
   receive, by a system-side audio handling input/output unit (SIO), a request from a software program executed by the computer system to consume past audio data from the ring buffer,
   provide, by the SIO, the past audio data starting from a SIO position, which is behind the DIO position, within the ring buffer to the software program,
   put, by the SIO, a client thread of the software program to sleep until the DIO position is ahead of the SIO position by at least a client-side offset; and
   when the DIO position is ahead of the SIO position by at least the client-side offset
      awake, by the SIO, the client thread of the software program; and
      provide, by the SIO, the audio data from the ring buffer to the software program by
   starting to provide the audio data from the SIO position within the ring buffer to the software program after providing the past audio data and catching up to the real-time audio data being written into the ring buffer.

10. The computer system of claim 9, wherein the one or more processors include a main processor and an auxiliary processor, wherein the main processor is operable to execute the software program and the SIO, and the auxiliary processor is operable to execute the DIO of the hardware device, and wherein the auxiliary processor is operable to execute the DIO of the hardware device when the main processor is deactivated.

11. A computer system having audio-based user input capability, comprising:
   a ring buffer;
   a microphone; and
   one or more processors to execute a device-side audio handling input/output unit (DIO) and a system-side audio handling input/output unit (SIO),
   wherein the DIO is a device driver of the microphone that writes digital audio data produced by the microphone at a DIO position within the ring buffer,
   wherein the SIO receives a request from a software program to consume past audio data from the ring buffer, wherein the SIO provides the past audio data starting from a SIO position, which is behind the DIO position, within the ring buffer to the software program, while the DIO continues to write the audio data being produced by the microphone at the DIO position within the ring buffer, and
   wherein the SIO is to put a client thread of the software program to sleep until the DIO position is ahead of the SIO position by at least a client-side offset, and when the DIO position is ahead of the SIO position by at least the client-side offset, the SIO is to (i) awaken the client thread of the software program, and (ii) provide the audio data from the ring buffer to the software program, and
   wherein the SIO provides the audio data from the SIO position within the ring buffer to the software program after providing the past audio data and catching up to real-time audio data being written into the ring buffer.

12. The computer system of claim 11, wherein the SIO provides an amount of the past audio data available in the ring buffer to the software program in response to receiving a request from the software program to determine how much of the past audio data is available in the ring buffer.

13. The computer system of claim 11, wherein the SIO provides an indication to the software program of whether the past audio data can be accessed in response to receiving a request from the software program to determine whether the past audio data can be accessed.

14. The computer system of claim 11, wherein the request to consume the past audio data from the ring buffer specifies a time value, wherein the time value corresponds to a position in the ring buffer from which to start providing the past audio data.

15. The computer system of claim 11, wherein the software program is a voice command application or a music recognition application.

16. The computer system of claim 11, wherein the software program and the SIO are executed by a main processor of the computer system and the DIO of the hardware device is executed by an auxiliary processor of the computer system, wherein the auxiliary processor is active while the main processor is deactivated.

17. The computer system of claim 11, wherein the DIO is executed in a kernel space of an operating system and wherein the ring buffer is in the kernel space of the operating system.

18. The computer system of claim 11 wherein the ring buffer, the microphone and a processor that executes the DIO are part of an in-vehicle infotainment unit, and another processor that executes the software program which is requesting to consume the past audio data and the SIO is in a handheld portable computer system communicatively linked to the in-vehicle infotainment unit.

* * * * *